Sept. 25, 1956

C. A. STRAYER 2,764,172

AIR VENTING VALVE

Filed Oct. 22, 1951

INVENTOR:
Chalmers A. Strayer

By Herbert E. Metcalf
His Patent Attorney 2,764,172
Patented Sept. 25, 1956

2,764,172

AIR VENTING VALVE

Chalmers A. Strayer, Wilmington, Calif., assignor to Northrop Aircraft, Inc., Hawthorne, Calif., a corporation of California Application October 22, 1951, Serial No. 252,536

2 Claims. (Cl. 137—43)

The present invention relates to air venting, and more particularly to a means for venting air from a pressurized reservoir in an aircraft hydraulic system.

In the co-pending U. S. application, Serial No. 252,537, filed October 22, 1951, a hydraulic reservoir for a hydraulic system is described, shown and claimed, wherein a positive internal-external pressure difference is maintained in the reservoir throughout the capacity range thereof so that a minimum positive suction head is maintained continuously for the system pump under substantially all flight conditions and at flight altitudes up to 60,000 feet.

While any air which may be present in such systems is usually bled off during routine service and maintenance, a certain amount of occluded and entrained air in the system will eventually work its way into the system reservoir during operation.

It is an object of the present invention to provide a means for venting air from a pressurized hydraulic reservoir in an aircraft hydraulic system, during the operation thereof which will not disturb the normal pressurizing processes.

In short, the vent valve of the present invention in one preferred form employs a valve body having one end thereof mounted in a pressurized hydraulic reservoir, preferably at the top thereof. The valve body has a coaxial chamber therein, a duct at one end thereof to admit fluid from the reservoir into the valve chamber, and a vent orifice extending through the other end of the valve chamber to atmosphere. A buoyant member is enclosed in the valve chamber and is provided with a soft seal on the end thereof which is adjacent the inner opening of the vent orifice. When fluid from the reservoir fills the vent chamber, the sealing end of the buoyant member is floated against the orifice preventing fluid from escaping therefrom. However, air which becomes entrapped in the reservoir is forced into the valve chamber through the duct by the normal reservoir pressurizing process and displaces fluid in the chamber causing the buoyant member to drop away from the orifice due to insufficient buoyancy and the air escapes out the orifice to atmosphere.

Where the vent valve of the present invention relates specifically to aircraft, as in the present case, means is provided to prevent fluid from leaking out of the vent orifice during inverted flight conditions when a gravity (G) loading might pull the buoyant member away from the vent orifice. In one form, the means can comprise a small chamber positioned in the valve duct intermediate the valve chamber and the reservoir chamber, and a heavy ball enclosed in the duct chamber. The end of the duct chamber adjacent the valve chamber is made to form a ball seat, the other end of the duct having a number of perforations arranged in a ring so that fluid and air from the reservoir chamber can pass around the ball to enter the valve chamber. When a "G" loading occurs, during inverted flight, which will tend to pull the buoyant member away from the orifice, fluid in the chamber prior to the inverted flight will displace to the opposite end of valve chamber, the ball, however, will drop into the ball seat to close off the duct and prevent air from reentering the reservoir from the valve chamber. Further, since fluid cannot enter the valve chamber to float the buoyant member during this condition, the buoyant member will drop to the normal sealing position over the vent orifice by its own weight.

The present invention will be more clearly understood by referring to the accompanying drawings wherein.

Figure 1:
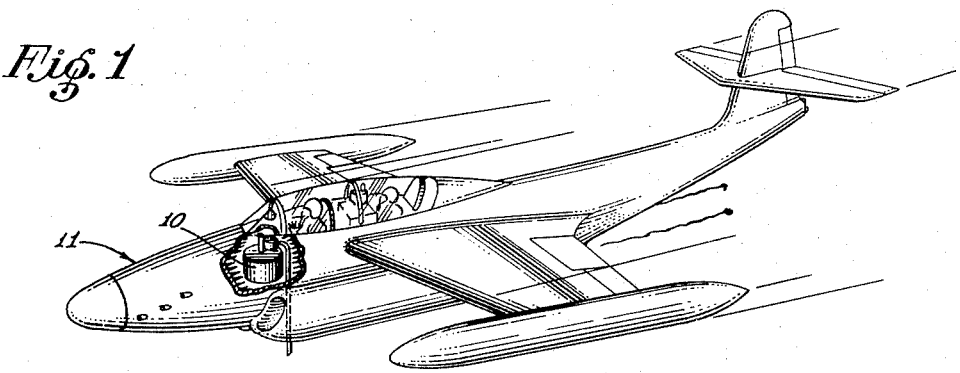
Fig. 1 is a perspective view of an aircraft which is cut away to show the approximate location of a hydraulic reservoir in normal flight position, wherein one form of the air venting valve of the present invention is employed.

In Figure 1, a pressure type hydraulic reservoir 10 is provided for the hydraulic system (not shown) in an airplane 11. Normally, the reservoir 10 is mounted in an upright position, i. e., the long axis of the reservoir 10 being vertical to the center line of the airplane 11 as shown.

Figure 2:
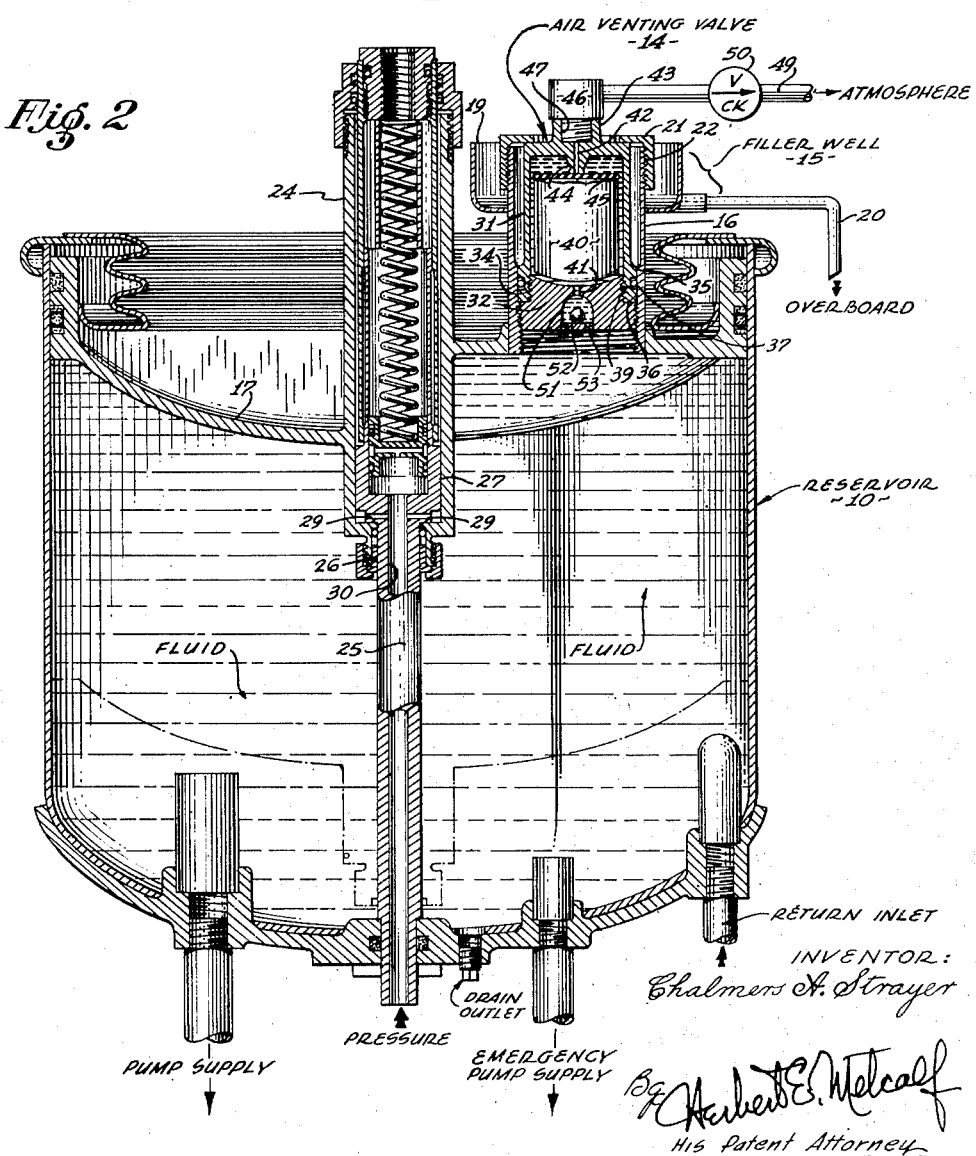
Figure 2 is a side elevational view in longitudinal section taken through the center of the reservoir and air venting valve shown in Figure 1.

An air venting valve 14 is preferably mounted in the top of the reservoir 10 as shown in Figure 2, and for the present example, is incorporated into the filler well 15 of the reservoir 10. The filler well 15 comprises a cylindrical sleeve 16 mounted in the top of reservoir pressurizing piston 17, a scupper 19 for catching spilled fluid and overflow which is then carried off by a drain line 20, and a cap 21 which is threaded onto an outer threaded end portion 22 of the filler well sleeve 16.

Briefly, the reservoir 10 assembly comprises the pressurizing piston 17 which has an actuating cylinder 24 assembly integrally mounted therein. The reservoir pressurizing piston 17 is longitudinally movable in the reservoir 10 in accordance with fluid pressure from the main hydraulic system (not shown) which enters a hollow piston rod 25 coaxially fixed at the bottom of the reservoir 10 and extending upwardly through the reservoir 10, passing through a seal 26 in the end of the piston actuating cylinder 24, to be connected with a stationary piston 27 mounted therein. Fluid is directed into the actuating cylinder 24 through a number of lateral passages 29 which intersect the interior passage 30 of the piston rod 25, to longitudinally move the pressurizing piston 17. In this manner, main system fluid pressure is used to supply the necessary forces for pressurizing the reservoir fluid.

The air venting valve 14 comprises a hollow body cylinder 31 enclosed at one end thereof. The other end of the body cylinder 31 is enclosed by a threaded end plug 32 which is in turn threaded into an internal threaded portion 34 of the body cylinder 31 for installation of the valve. The body cylinder 31 has a shouldered bearing portion 35 adjacent the lower end thereof which bears on a facing shoulder portion 36 of the filler well 16 to provide a smooth sealing surface. An O ring seal 37 retained in an annular groove 39 in the shoulder portion 35 of the cylinder body 31 prevents leakage between the shoulder portion 36 of the well sleeve 16 and the valve cylinder 31. A cylindrical hollow weighted float 40 is enclosed in the cylinder body 31 and is floated therein by reservoir fluid from the reservoir 10 which extends into the valve body cylinder 31 through a duct 41 which extends axially through the end plug 32. A vent passage 42 extends coaxially through the closed end of the body cylinder 31 and has a boss-like extension forming a nozzle 44 around the inner opening of the vent passage 42. A soft seal 45, preferably of a material which is not substantially affected by hydraulic fluid, such as neoprene for example, is provided on the end of the float 40 adjacent the vent nozzle 44. Normally then, the float 40 is floated by reservoir fluid against the vent nozzle 44, thereby sealing the vent passage 42 and preventing the pressurized fluid from escaping therefrom. However, occluded and entrained air from the reservoir 10 is forced into the valve body cylinder 31, displacing the fluid around the float 40 and allowing the float 40 to drop away from the vent nozzle 44, and the air escapes out the vent passage 42 to atmosphere.

To prevent air from being sucked into the reservoir 10 through the vent passage 42 during ground operation, a fitting 46 is retained in an outer extension 43 of the vent passage 42, being threaded into the internal threaded portion 47 of the extension 43, connecting the vent passage 42 to a vent line 49. A check valve 50 is provided in the line 49 to restrict the passage of air to atmosphere only.

A bell shaped chamber 51 is provided in the duct 41 of the end plug 32 and retains a heavy ball 52. Fluid or air from the reservoir 10 passes around the ball 52 by means of a number of small holes 53 arranged in a ring around the duct opening.

During inverted flight, the ball 52 drops over the duct 41 leading to the float chamber 31 and prevents any air which may be entrapped there from reentering the reservoir 10.

During a "G" loading exerted upon the float 40, such as when the airplane is pulling out of a steep dive for example, such "G" loading will tend to pull float 40 downwardly away from vent nozzle 44 leaving vent passage 42 temporarily open to the escape of fluid and air from float chamber 31. However, in so doing, float 40 will bottom in chamber 31 and seal duct 41 to prevent the passage of fluid therethrough from reservoir 10. Thus, any loss of fluid occurring during unusual flight maneuvers where "G" loadings are imposed upon float 40 will be negligible; lasting only until the float 40 moves to reseal the vent nozzle 44 when the "G" loading is alleviated as the airplane resumes normal flight.

It can be seen from the foregoing that a reliable yet simple air venting valve is provided for a pressurized reservoir which will automatically vent air therefrom under substantially all operating conditions.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. In combination with an invertible hydraulic reservoir for an airplane hydraulic system, said reservoir being filled with hydraulic fluid under pressure, means for expelling air from said reservoir, comprising a valve mounted in said reservoir, a cylindrical fluid chamber coaxially positioned in said valve, a fluid duct extending from said reservoir and opening coaxially in one end of said fluid chamber, an air vent opening coaxially in the other end of said fluid chamber and connecting said fluid chamber to atmosphere, the inner opening of said air vent being formed to define a symmetrical nozzle protruding coaxially into said chamber and having an annular plane concentric around said vent at substantially right angles to the axis of said fluid chamber, a cylindrical weighted floatable member axially movable in said fluid chamber, said floatable member having one end thereof in a plane at right angles to the axis of said fluid chamber and a soft seal mounted thereon to cover said vent nozzle, said fluid extending through said fluid duct into said fluid chamber to float said floatable member against said vent nozzle, said soft seal closing said air vent to prevent the passage of fluid therethrough, whereby when air from said reservoir enters said chamber through said fluid duct, fluid is displaced into said reservoir by said air allowing said weighted float member to drop away from said vent nozzle due to insufficient buoyancy, said air then being allowed to escape through said vent nozzle to atmosphere, and sealing means operating to close said fluid duct when said reservoir is inverted to prevent the re-entry of air into said reservoir from said fluid chamber.

2. Apparatus in accordance with claim 1 wherein said sealing means comprises a ball chamber coaxially positioned in said fluid duct intermediate said reservoir and said fluid chamber, one end of said ball chamber being positioned in said reservoir, an annular end plug being threaded into said ball chamber between said reservoir and said ball chamber and having a plurality of openings therein to pass fluid therethrough, the other end of said ball chamber being shaped to define a concave ball seat, a free ball in said ball chamber, said ball being sized to conform to said concave ball seat, said ball being movable to seat in said ball seat when said reservoir is inverted from normal position to close said fluid duct intermediate said reservoir and said fluid chamber to prevent air from said fluid chamber to re-enter said reservoir through said fluid duct.

References Cited in the file of this patent

UNITED STATES PATENTS

| | | |
|---|---|---|
| 821,624 | Edison | May 29, 1906 |
| 1,517,459 | Reiter | Dec. 2, 1924 |
| 1,923,384 | Miller | Aug. 22, 1933 |
| 1,966,706 | Brown | July 17, 1934 |
| 2,111,473 | Hudson | Mar. 15, 1938 |
| 2,182,266 | Schwartz | Dec. 5, 1939 |
| 2,194,348 | Zoder | Mar. 19, 1940 |
| 2,195,266 | Bailey | Mar. 26, 1940 |
| 2,396,233 | Abrams | Mar. 12, 1946 |
| 2,510,098 | Geisler | June 6, 1950 |

FOREIGN PATENTS

| | | |
|---|---|---|
| 127,939 | Great Britain | May 21, 1919 |